United States Patent
Goossen et al.

(10) Patent No.: US 7,437,483 B1
(45) Date of Patent: Oct. 14, 2008

(54) SYSTEM AND METHOD FOR TRANSFERRING A COMPRESSED DATA FILE TO A PERIPHERAL DEVICE

(75) Inventors: J. Andrew Goossen, Issaquah, WA (US); Hock San Lee, Redmond, WA (US); John C. Bowler, Mountain View, CA (US); Feng Yue, Redmond, WA (US); Gilman Kuey Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/520,435

(22) Filed: Mar. 8, 2000

Related U.S. Application Data (60) Provisional application No. 60/125,902, filed on Mar. 24, 1999.

(51) Int. Cl.
 *G06F 15/16* (2006.01)
 *G06K 15/00* (2006.01)
(52) U.S. Cl. .................. 709/247; 709/246; 358/1.1; 358/1.2; 358/1.9; 358/426.01
(58) Field of Classification Search ......... 709/246–247, 709/220, 221, 222; 382/167, 240; 358/1.1, 358/1.2, 1.9, 426.01
See application file for complete search history.

(56) References Cited

U.S. PATENT DOCUMENTS

| | | | | |
|---|---|---|---|---|
| 5,386,512 A | * | 1/1995 | Crisman et al. | 709/228 |
| 5,471,563 A | * | 11/1995 | Dennis et al. | 358/1.15 |
| 5,533,175 A | * | 7/1996 | Lung et al. | 358/1.16 |
| 5,542,031 A | * | 7/1996 | Douglass et al. | 358/1.15 |
| 5,557,749 A | * | 9/1996 | Norris | 709/228 |
| 5,611,024 A | * | 3/1997 | Campbell et al. | 358/1.15 |
| 5,617,517 A | * | 4/1997 | Chi | 358/1.15 |
| 5,619,594 A | * | 4/1997 | Melen | 382/233 |
| 5,621,894 A | * | 4/1997 | Menezes et al. | 709/227 |
| 5,729,668 A | * | 3/1998 | Claflin et al. | 358/1.15 |
| 5,742,773 A | * | 4/1998 | Blomfield-Brown et al. | 709/228 |
| 5,859,979 A | * | 1/1999 | Tung et al. | 709/228 |
| 5,907,835 A | * | 5/1999 | Yokomizo et al. | 707/1 |
| 5,949,964 A | * | 9/1999 | Clouthier et al. | 358/3.06 |

(Continued)

OTHER PUBLICATIONS

U.S. Appl. No. 09/186,363 which is the parent application of USPN 6,525,830.*

(Continued)

*Primary Examiner*—Nathan J. Flynn
*Assistant Examiner*—Alina N. Boutah (57) ABSTRACT

An image passthrough extension structure and method facilitating the transfer of compressed data image files from a software application to a device via the computer system operating system. The application determines whether the device is capable of decoding the specific compressed data file by polling the device driver. If the driver returns a "no support" message, the application processes the compressed data file in a conventional manner. If the driver returns a "support" message, the application transfers the compressed data file, along with the additional processing information, to the device driver utilizing the conventional file transfer operating system data structures modified to incorporate the compressed data file passthrough function. By allowing an application to transfer a compressed image file directly to a device driver, the present invention improves image fidelity and improves overall computer system efficiency by reducing the size of data files transferred between the application, the operating system and the hardware device.

20 Claims, 9 Drawing Sheets

U.S. PATENT DOCUMENTS

| | | | |
|---|---|---|---|
| 5,991,515 A * | 11/1999 | Fall et al. | 358/1.15 |
| 6,009,192 A * | 12/1999 | Klassen et al. | 382/167 |
| 6,034,782 A * | 3/2000 | Hines | 358/1.14 |
| 6,038,033 A * | 3/2000 | Bender et al. | 358/1.16 |
| 6,040,792 A * | 3/2000 | Watson et al. | 341/100 |
| 6,141,705 A * | 10/2000 | Anand et al. | 709/223 |
| 6,147,770 A * | 11/2000 | Unishi et al. | 358/1.2 |
| 6,175,856 B1 * | 1/2001 | Riddle | 709/204 |
| 6,243,420 B1 * | 6/2001 | Mitchell et al. | 375/240.18 |
| 6,415,058 B2 * | 7/2002 | Grohs et al. | 382/239 |
| 6,523,102 B1 * | 2/2003 | Dye et al. | 711/170 |
| 6,525,830 B1 * | 2/2003 | Yang | 358/1.1 |
| 6,535,292 B1 * | 3/2003 | Kuroi | 358/1.11 |
| 6,538,758 B1 * | 3/2003 | Ikegawa | 358/1.13 |
| 6,657,561 B1 * | 12/2003 | Hanna | 341/50 |
| 6,707,945 B2 * | 3/2004 | Hamzy et al. | 382/232 |
| 6,707,948 B1 * | 3/2004 | Cosman et al. | 382/240 |
| 6,711,294 B1 * | 3/2004 | Hamzy et al. | 382/232 |
| 7,089,391 B2 * | 8/2006 | Geiger et al. | 711/170 |
| 2001/0043723 A1 * | 11/2001 | Kadota et al. | 382/113 |
| 2001/0043753 A1 * | 11/2001 | Grohs et al. | 382/248 |
| 2002/0159087 A1 * | 10/2002 | Yoshida et al. | 358/1.15 |

OTHER PUBLICATIONS

U.S. Appl. No. 09/186,363, filed Nov. 5, 1998, which is the parent application of USPN 6,525,830.*

* cited by examiner

SYSTEM AND METHOD FOR TRANSFERRING A COMPRESSED DATA FILE TO A PERIPHERAL DEVICE

This application is entitled to priority pursuant to a provisional application filed Mar. 24, 1999, Ser. No. 60/125,902.

TECHNICAL FIELD

In general, the present invention relates to computer software and hardware and in particular, to a method and structure for processing compressed data image files utilizing image passthrough extensions.

BACKGROUND OF THE INVENTION

In general, conventional devices, such as a printer, can receive and process compressed data files, such as JPEG or PNG compressed image files. However, most conventional computer systems having an operating system and one or more software applications running within the operating system do not provide a standardized format, such as an escape, to allow a software application to transfer a compressed data file directly to the device, including either a hardware device or a device driver. Accordingly, to pass a compressed file directly to a device, the application would typically have to recognize the individual device and have code specific to the device. However, as devices are upgraded or new devices are added, the application would no longer be compatible with these devices if the driver was modified. Moreover, a device specific driver would prevent an operating system from group formatting the compressed image, especially when multiple images are processed at the same time.

Because of the deficiencies associated with device-specific drivers, one conventional method for transferring compressed data image files from a software application to a device entails an application first decompressing the compressed image file into a device independent bitmap (DIB) format. This requires that each software application have the capability to properly decompress assorted compressed image files. Moreover, there is the potential for one or more conversion losses by the software application. For example, a typical DIB allows a maximum of 8-bits per color channel. If the image format and device support greater image fidelity, such as 16 bits per color channel, the fidelity would be lost during the DIB intermediate conversion.

Once the software application has decompressed the compressed image file into a DIB format under the conventional method, the software application then transfers the DIB via an application programming interface (API) to the operating system graphics device interface (GDI). Upon receiving the DIB, the GDI either stores the DIB within the GDI for immediate transfer to the device driver or sends the DIB to a spooler for later processing. In both scenarios, the transfer of an uncompressed DIB to the GDI places a greater strain on system resources in terms of greater requirements of processing time and increased burden on the data communication resources between the software application and the operating system. Additionally, if the GDI utilizes a spooler, the transfer of the uncompressed DIB from the GDI to the spooler utilizes more spooler storage space as well as placing a greater strain on system communication resources in transferring the DIB image to and from the spooler.

To complete the conventional file transfer, the DIB is transferred from the GDI to the device driver via a device driver interface (DDI). Again, the transfer of the uncompressed DIB from the GDI to the device driver places a greater strain on the computer system communication resources between the operating system and the hardware device.

Thus, there is a need for a compressed data file transfer structure and method in which the compressed files are transferred to a device without uncompressing the file.

SUMMARY OF THE INVENTION

The present invention satisfies the above-described need by providing an image passthrough extension structure and method in which compressed data files are transferred to a device utilizing standard escapes and modified conventional file transfer structures.

Generally described, the present invention provides a method in a computer system for transferring a compressed data file from a software application running within the computer system to a device in communication with the operating system. According to the method, a request is received to transfer a compressed data file and a determination is made as to whether the device is capable of decoding the specific compressed image to be transferred. If the device is configured to decompress the compressed data file, the compressed file is transferred to the device driver via a device driver interface.

In another aspect of the present invention, a computer-readable medium is provided. The computer-readable medium has computer-executable components including a device support query component for determining whether a device is configured to decompress a compressed data file associated with an application, an application interface component for receiving the compressed data file from the application and a device interface component for transferring the compressed data file to the device.

In a further aspect of the present invention, a method in a computer system is provided for transferring compressed image data from a software application running within the computer system to a device in communication with the computer system. According to the method, a file query is received from a software application containing a pointer to the compressed image data and a designation of the type of compressed data image. The image data designation is compared with a data structure containing data indicative of the types of compressed data image files supported by the hardware device. If the device supports the type of compressed image data, a pointer to the compressed image data and the compressed image data designation is passed to the device. If the device is configured to decompress the compressed image data, an answer is returned and a data structure having data indicative of the compressed image data is received from the software application. Upon receiving the data structure, the compressed image data is transferred to the device driver via a device driver interface.

In yet another aspect of the present invention, a method is provided for transferring a compressed data file from a software application running within a computer system to a device in communication with the computer system. According to the method, a determination of whether the device is configured to decompress the compressed data file is requested. Upon receiving a response that the hardware device is so configured, the compressed data file is transferred to the computer system.

In yet a further aspect of the present invention, a computer-readable medium is provided. The computer-readable medium has stored on it a data structure containing a first field containing data indicative of a classification of a compressed data file, a second field containing data indicative of the compressed data file, and a third field containing data indicative of whether a device is configured to decompress the compressed data file.

By allowing an application to transfer a compressed image file directly to a device, the present invention minimizes application decompression error and improves overall computer system efficiency.

BRIEF DESCRIPTION OF THE DRAWING

The present invention is described in detail below with reference to the attached figures, wherein.

DETAILED DESCRIPTION OF THE INVENTION

Figure 1:
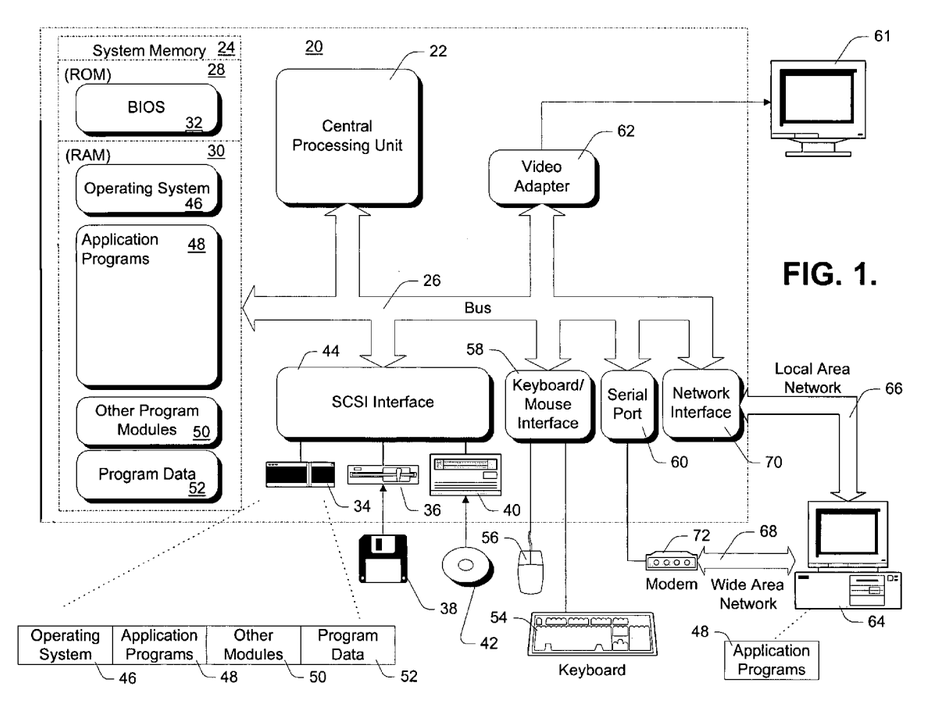
FIG. 1 is a block diagram of a computing system environment suitable for use in implementing the present invention.

The present invention provides a method for processing compressed data files directly from a software application to a device. FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 20. Computer readable media typically embodies computer readable instructions, data structures, program or modules. Combinations of any of the above should also be included within the scope of computer readable media.

The system memory 24 includes computer storage media in the form of volatile and/or nonvolatile memory such as read only memory (ROM) 28 and random access memory (RAM)

30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 1 illustrates operating system 46, application programs 48, other program modules 50, and program data 52.

The computer 20 may also include other removable/non-removable, volatile/nonvolatile computer storage media. By way of example only, FIG. 1 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 1, provide storage of computer readable instructions, data structures, program modules and other data for the computer 20. In FIG. 1, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 1. The logical connections depicted in FIG. 1 include a local area network (LAN) 66 and a wide area network (WAN) 68, but may also include other networks. Such networking environments are commonplace in offices, enterprise-wide computer networks, Intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 1 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 2:
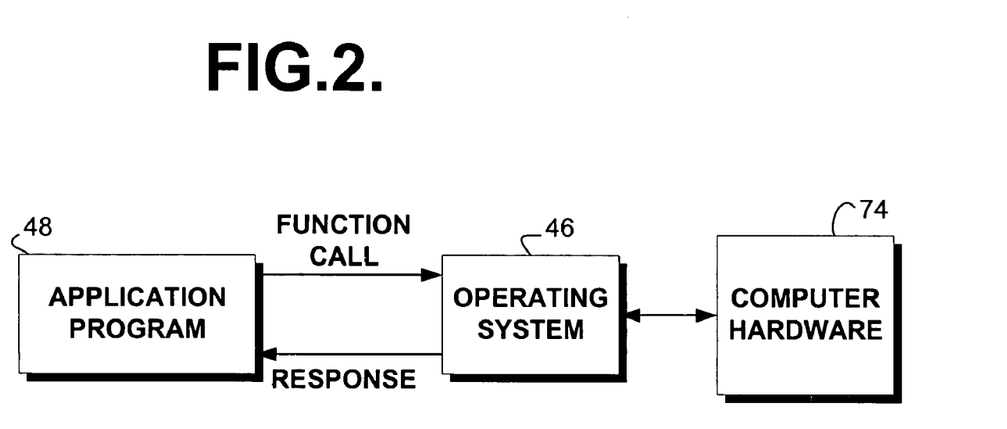
FIG. 2 is a block diagram illustrating the interface between various computer input/output devices, an operating system, and an application program.

FIG. 2 illustrates the interaction between the computer hardware 74, the operating system 46 and an application program 48. Referring now to FIGS. 1 and 2, the operating system 46 is loaded into RAM 30 when the computer 20 is turned on or reset. The operating system 46 provides the basic interface between the computer's resources, the user and the application program 48. The operating system 46 interprets and carries out instructions issued by the user. For example, when the user wants to load an application program 48, the operating system 46 interprets the instruction and causes the processing unit 22 to load the program from the hard disk drive 34 into the RAM 30. Once the application program 48 is loaded into RAM 30, it is executed by the processing unit 22. In the case of large programs, the processing unit 22 loads various portions of the program 48 into RAM 30 as needed.

The operating system 46 also provides a variety of functions or services that allow application program 48 to deal with various types of input/output (I/O). This allows an application program 48 to issue simple function calls that cause the operating system 46 to perform the steps required to accomplish the tasks, such as displaying text on the monitor 61.

With continued reference to FIG. 2, the application program 48 communicates with the operating system 46 by calling predefined function calls provided by the operating system 46. The operating system 46 responds by providing the requested information or executing the requested task.

The present invention relates to a method and structure for the processing of compressed data files from a software application to a device, via an operating system, without requiring a decompression of the file by the operating system. Specifically, a preferred embodiment of the present invention is a method and structure for processing compressed data image files utilizing image passthrough extensions to allow a software application to transfer compressed data image files directly to a device without first decompressing the data image file. As would be readily understood by those skilled in the relevant art, the present invention is applicable with other types computer system compressed data files. Moreover, the present invention is preferably described in relation to the processing of Joint Photographic Expert Group (JPEG) compressed data image files and Portable Network Graphics (PNG) compressed data image files. As would be further understood, the present invention is applicable to alternative types of compressed data image files as well as with compressed data image files utilizing the JPEG or PNG compressed data image format such as the JPEG File Interchange Format (JFIF), Digital Still Camera Image File Format Standard (Exif) or Still Picture Interchange File Format (SPIFF).

Figure 3:
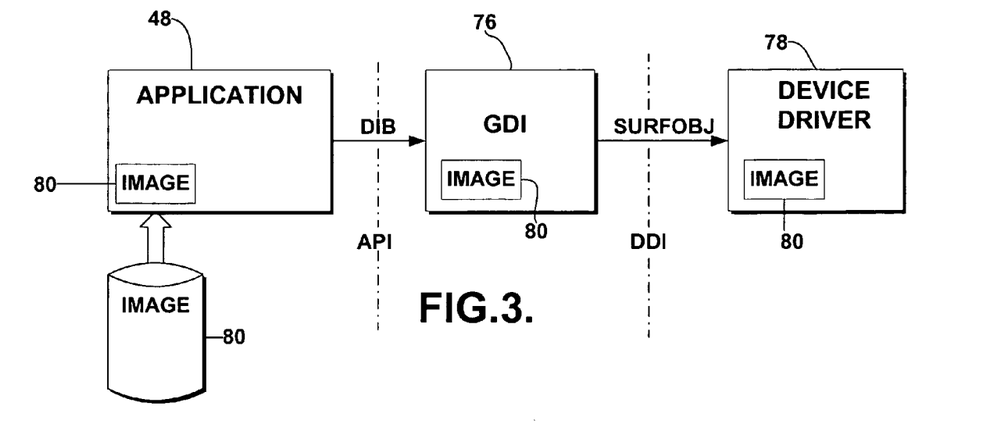
FIG. 3 is a block diagram illustrating the interface between an application, the GDI of an operating system, and a device driver.
Figure 4:
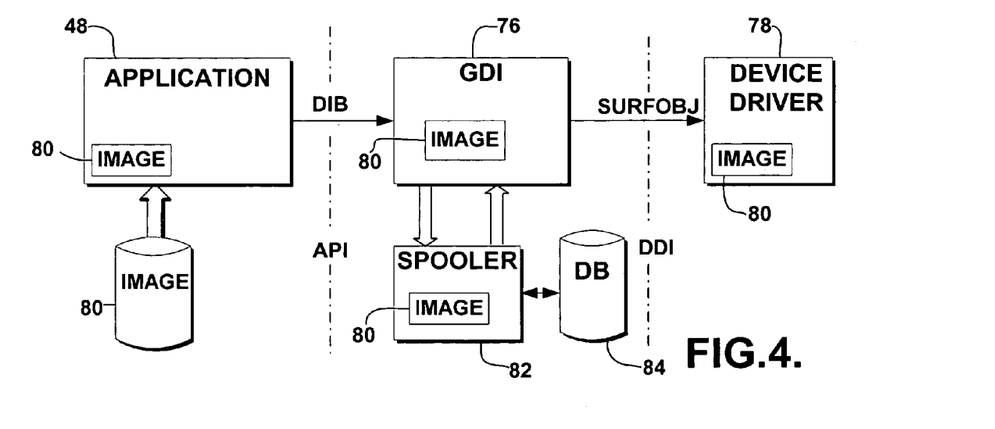
FIG. 4 is a block diagram illustrating the interface between an application, the GDI of an operating system having a printing spooler, and a device driver.

FIGS. 3 and 4 illustrate the typical interaction between a software application 48, the graphics device interface (GDI) 76 of the operating system and a device driver 78 of a hardware device. In general, a software application 48 attempting to transfer an image file 80 to the device driver 78 reads the image 80 into a memory and transfers it to the GDI 76. The GDI 76 either reads the image 80 into its memory, or, as illustrated in FIG. 4, transfers the image 80 to a spooler 82 which stores the image 80 into a database 84. When the GDI 76 is directed to transfer the image to the device driver 78, the image is passed to device driver 78 which reads, stores and parses the image.

As applied to the conventional image transfer method, the image 80 is decompressed into a DIB prior to being passed to the GDI 76. Accordingly, the image 80 is now an uncompressed DIB, which is larger in size than the original compressed image. As would be understood, the larger the image 80, the greater strain on the communication resources between the software application 48, the GDI 76 and the device driver 78. Moreover, a larger image 80 consumes more memory space within the spooler database 84.

Figure 5:
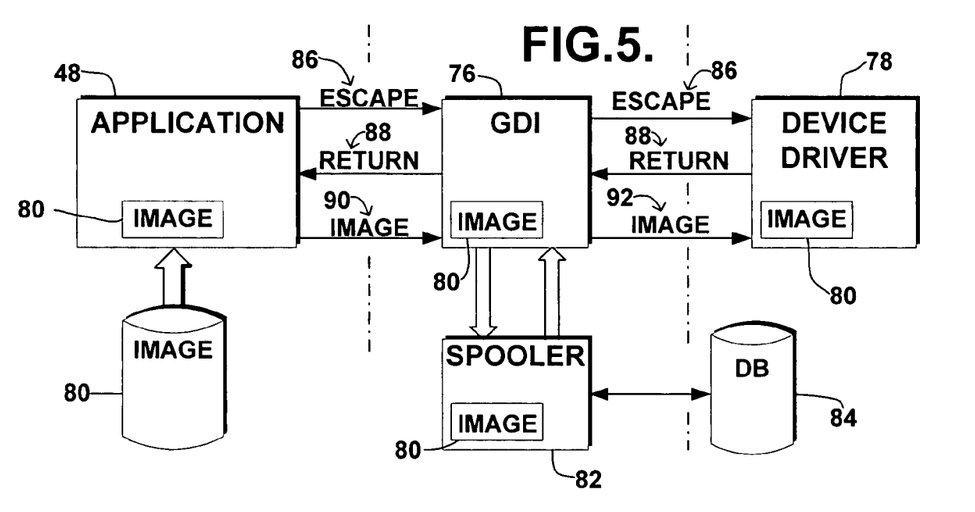
FIG. 5 is block diagram illustrating the interface between an application, the GDI of an operating system having a printing spooler, and a device driver in accordance with the compressed data image file transfer method of the present invention.

FIG. 5 is representative of the interaction between the software application 48, the GDI 76 and the device driver 78 of a hardware device in accordance with the image passthrough method and structure of the present invention. In general, the present invention preferably utilizes the same logical progression for image file transfers as illustrated in FIGS. 3 and 4, while utilizing expanded or new data transfer data structures to allow the compressed image to pass from the software application 48 to the device driver 78. In general, escape functions 86 and return functions 88 denote the query component which allow the software application 48 to determine whether the device driver 78 is capable of receiving the compressed image 80 to the GDI 76. If the application 48 receives an affirmative response from the GDI 76, an interface 90 denotes the passing of the image 80 to the GDI 76.

Upon receiving the image 80, the GDI 76 may read and store the image 80 in a local memory, or may send the image 80 to the spooler 82 to be stored on the spooler database 84. As would be readily understood, different or modified configurations of the GDI spooler are within the scope of the invention. When appropriate, an interface 92 denotes the passing of the compressed image 80 to the device driver 78. The image 80 is stored and parsed by the device driver 78 before being passed to the hardware device.

Figure 6:
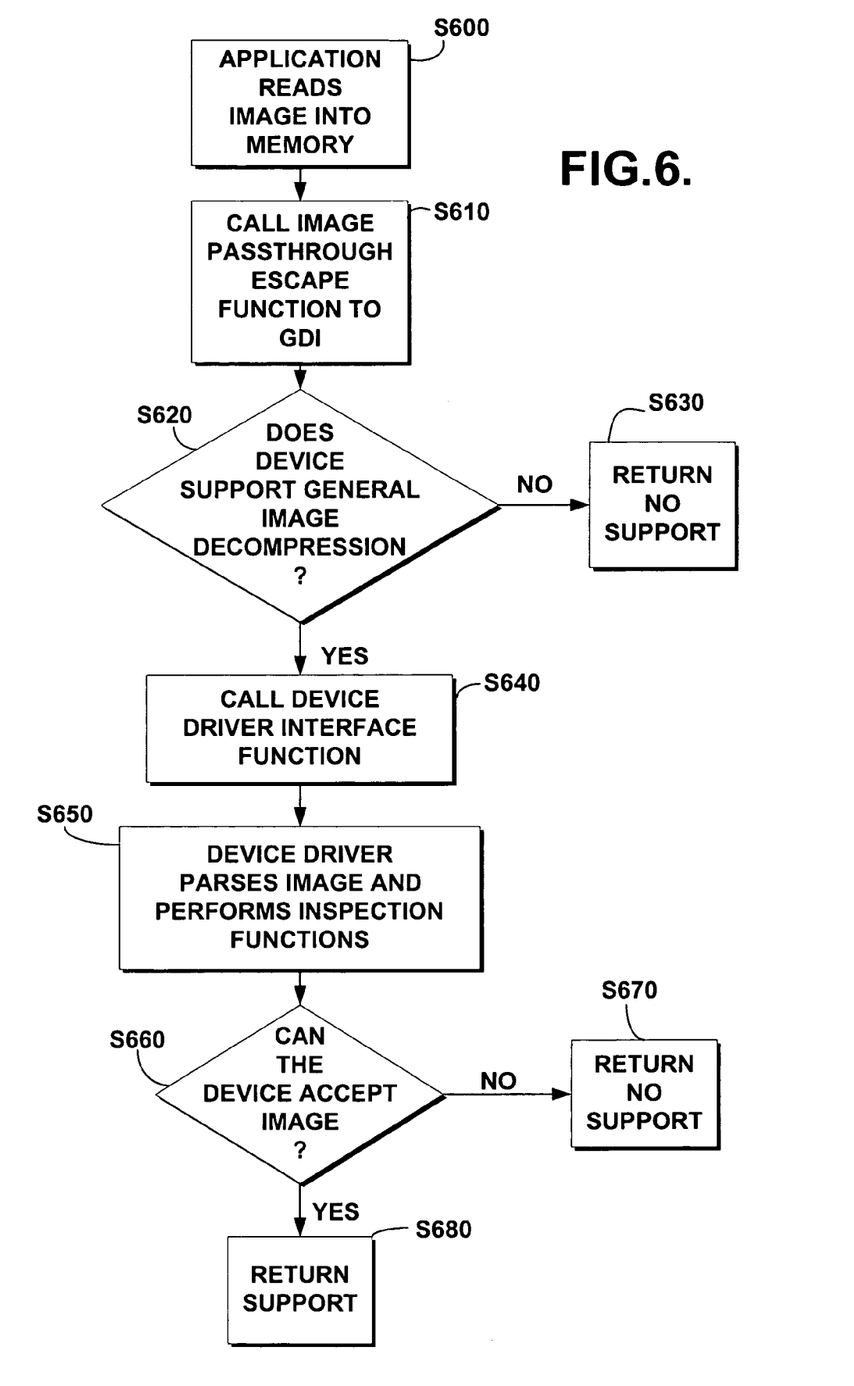
FIG. 6 is flow diagram representative of a computer program for a compressed data image file transfer method of the present invention.
Figure 7:
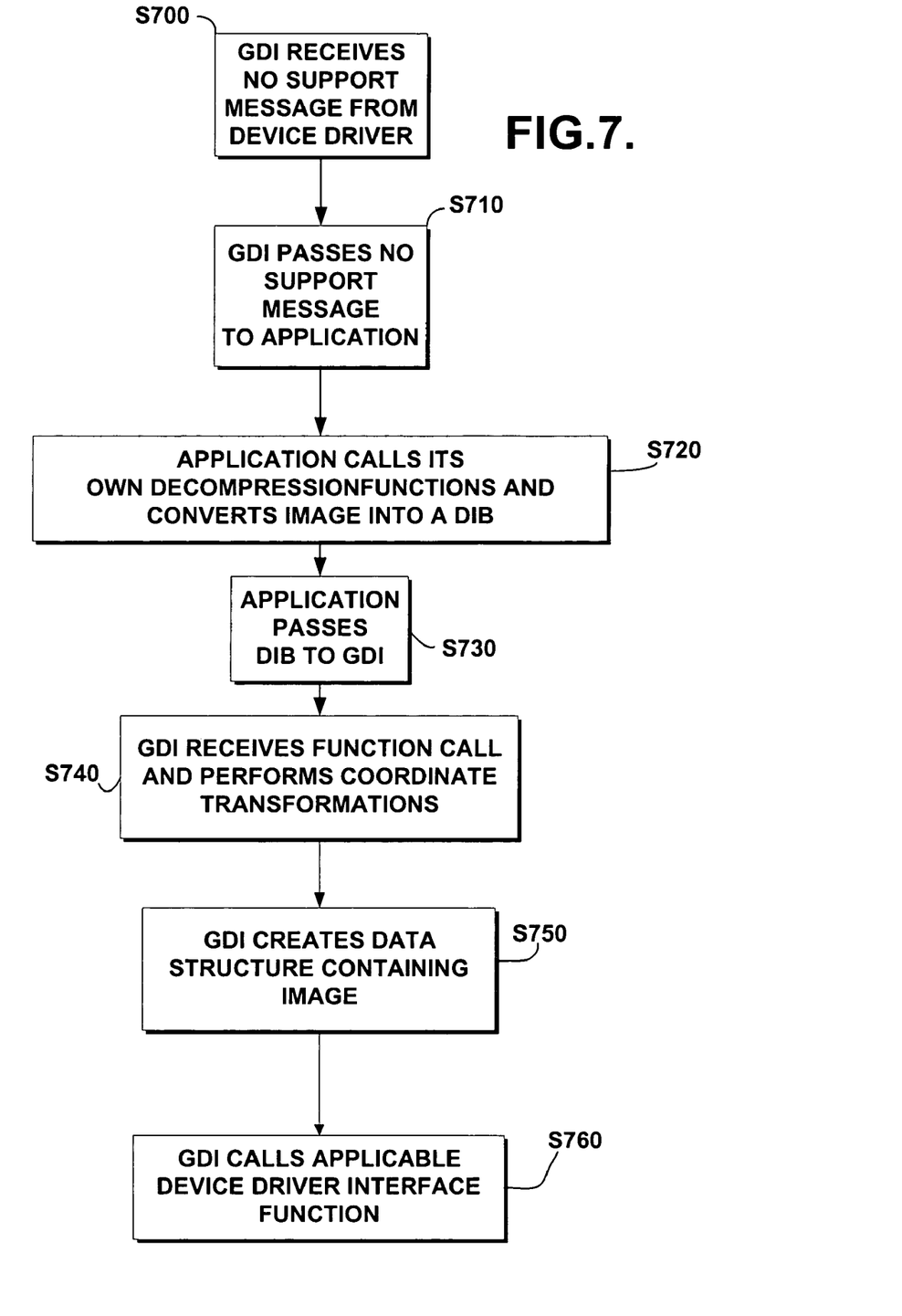
FIG. 7 is a flow diagram representative of a computer program for a compressed data image file transfer method of the present invention.
Figure 8:
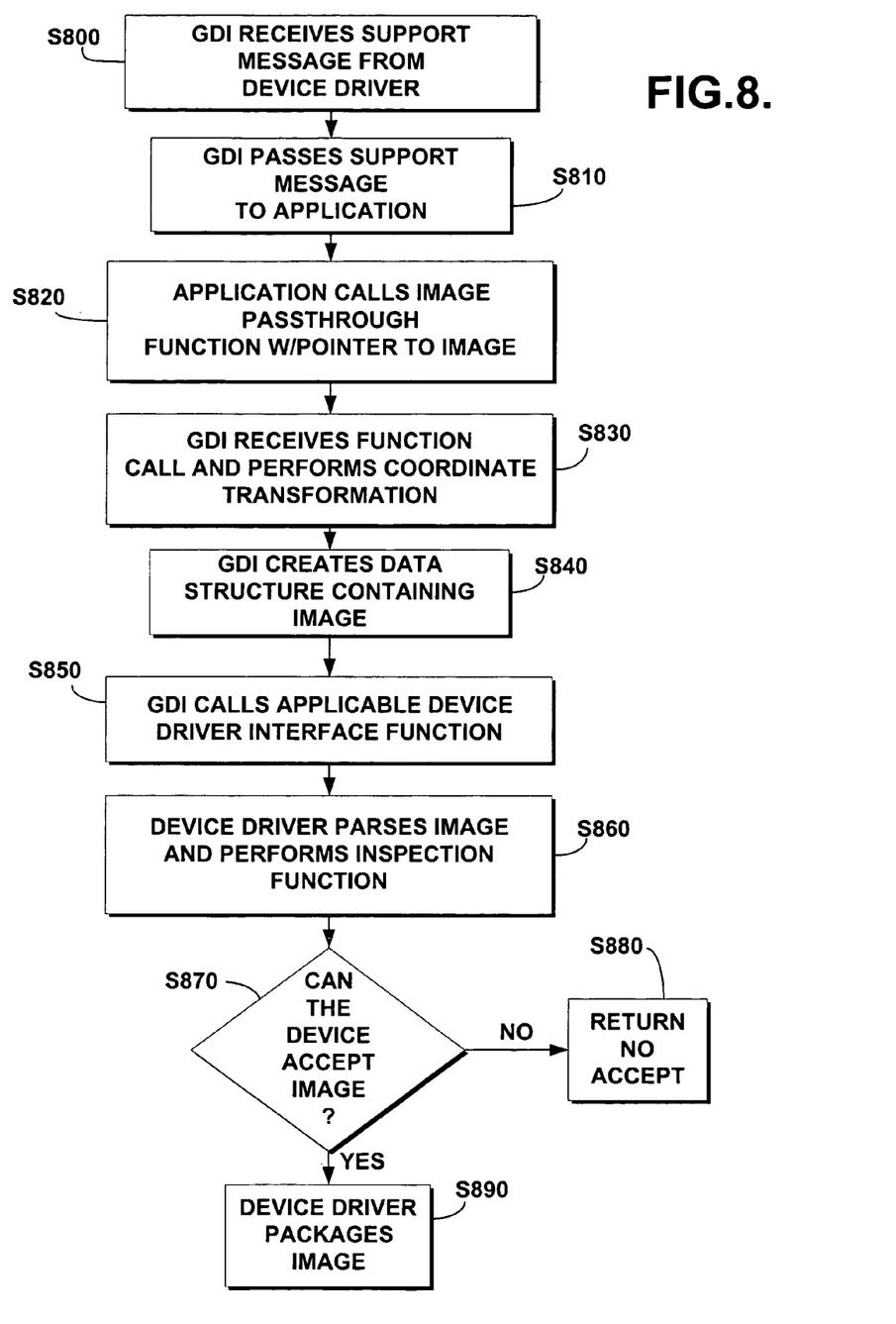
FIG. 8 is a flow diagram representative of a computer program for a compressed data image file transfer method of the present invention.
Figure 9:
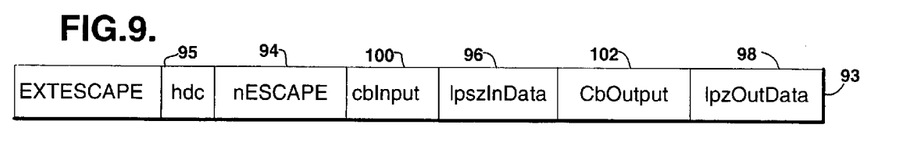
FIG. 9 is a block diagram of an EXTESCAPE application program interface utilized by the data image transfer method of the present invention.

FIGS. 6, 7 and 8 are flow diagrams of the image passthrough extension method utilized by the present invention. At S600 (FIG. 6), the application reads a compressed image to be transferred into memory. At S610, the application calls an image passthrough escape function to determine whether a targeted device is capable of receiving and processing the compressed image file. FIG. 9 is illustrative of an application program interface (API) utilized by the software application to query the configuration of the targeted device, generally described as the EXTESCAPE function 93. A "hdc" field 95 contains a handle to the device context and a "nESCAPE" field 94 contains data indicative of the type of query the software application wants to conduct. Preferably, the "nESCAPE" field 94 contains a flag indicating either a CHECKJPEGFORMAT indication to check for a JPEG configuration or a CHECKPNGFORMAT indication to check for a PNG configuration. A "lpszInData" field 96 contains data indicative of a property of the compressed data file to be transferred. Preferably, the "lpszInData" field 96 contains a pointer to an input buffer where the image is stored. A "lpzOutData" field 98 contains data indicative of the results of the query. Preferably, the "lpzOutData" field 98 contains a pointer to an output buffer indicating the results of the query. Additionally, a "cbInput" field 100 contains data indicative of the size of the input buffer and a "cbOutput" field 102 contains data indicative of the size of the output buffer. As would be understood, different and/or combined fields for this data structure are within the scope of the invention.

Figure 10:
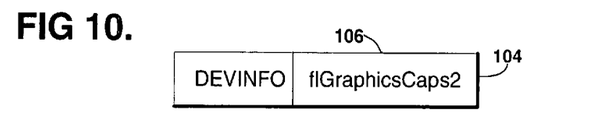
FIG. 10 is a block diagram of a subset of a DEVINFO data structure utilized by the data image transfer method of the present invention.

Referring again to FIG. 6, at S620, the GDI receives the EXTESCAPE function and determines whether the device driver can support general image decompression. Preferably, the device driver indicates, by setting a bit in a data structure, whether it can accept JPEG or PNG images. FIG. 10 is illustrative of a subset of a DEVINFO data structure 104 utilized by the device driver to indicate whether or not certain compressed image files can be accepted by the device. Preferably, a "flGraphicsCaps2" field 106 is set if the device driver will accept JPEG or PNG files and not set if it cannot. The DEVINFO data structure 104 may also contain additional fields (e.g. "lfDefaultFont") which retain their conventional definition and function.

If the device driver indicates that it cannot support general image decompression at S620, the GDI returns a no support message at S630 to the software application. If the device driver indicates that it can support general image decompression at 620, the GDI calls a device driver interface (DDI) to determine whether a targeted device is capable of receiving the compressed image file at S640.

Figure 11:
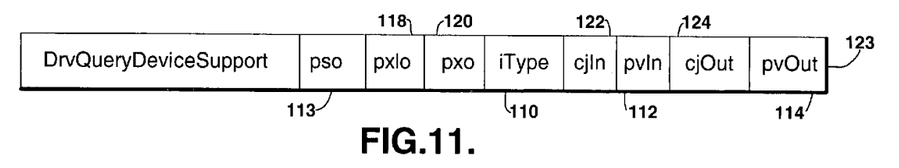
FIG. 11 is a block diagram of a DrvQueryDeviceSupport device driver interface utilized by the data image transfer method of the present invention.

FIG. 11 is illustrative of a device driver interface utilized by the GDI to query the configuration of the targeted device, generally described as the DrvQueryDeviceSupport function 123. An iType field 110 contains data indicative of the type of compressed data image file that is to be transferred. Preferably, the iType field 110 contains either a QDS_CHECKJPEGFORMAT indication to check for a JPEG configuration or a QDS_CHECKPNGFORMAT indication to check for a PNG configuration.

A pvIn field 112 contains data indicative of a property of the compressed data file to be transferred. Preferably, the pvIn field 112 contains a pointer to an input buffer where the image is stored. Additionally, a pso field 113 specifies the device surface and a pxlo field 118 and a pxo field 120 specify additional image processing information. Preferably, the pxlo field 118 specifies XLATEOBJ information which is used to translate color indices relating to a color pallette and the pxo field 120 specifies XFORMOBJ information which is used to describe an arbitrary linear two-dimensional transform. Moreover, a cjIn field 122 specifies the size of the input buffer. Finally, a pvOut field 113 contains data indicative of an output pointer and a cjOut field 124 specifies the size of the output buffer. Preferably, the pxo field 120, cjOut field 124 and pvOut field 114 are not utilized when either a QDS_CHECK-JPEGFORMAT or a QDS_CHECKPNGFORMAT is designated in the iType field 110. As would be understood, different and/or combined fields for this function are within the scope of the invention.

With reference again to FIG. 6, upon receiving the call to the DDI in S640, the device driver parses the image and performs inspection functions in S650. In S650, the device driver may decompress and read only a portion of the compressed file, or it may attempt to completely decompress the entire file in performing the parsing and inspection functions. At S660, the device driver determines whether itself or the hardware device can decompress and process the image. If neither can, the device driver returns a "no support" indication at S670. Alternatively, if the device driver determines that either itself or the hardware device can accept the image 80, it returns a "support" message at S680.

FIG. 7 is a flow diagram representative of the branch of the method of the present invention when a "no support" message is received. At S700, the GDI either prepares a no support message at S630 (FIG. 6) or receives a no support message at S670 (FIG. 6). The GDI then sends the "no support" message to the application in S710. The no support message is preferably returned to the software application in the output buffer pointed to by the "lpzOutData" field 98 of the EXTESCAPE function 93 (FIG. 9). Upon receiving the "no support" message, the software application calls its own supported decompression functions to decompress the compressed image into a device independent bitmap (DIB) at S720. At S730, the software application passes the DIB to the GDI utilizing conventional data structures and function calls. At S740, the GDI receives the DIB and performs coordinate transformations (such as computing the placement and size of the image on the page using the state associated with the GDI's device context or hdc). Additionally, the GDI can also perform image processing on the DIB. Some examples of image processing include rotating an image, warping an image, enhancing the contrast of the image, blurring an image, and sharpening an image. At S750, the GDI incorporates the image into a data structure, such as a SURFOBJ data structure, and calls the applicable device driver interface function to pass the DIB at S760.

Because the device driver indicated that neither it nor the hardware device could decompress the data image, the compressed image is preferably processed in a conventional manner by decompressing the image and passing it to the device driver as a DIB. Alternatively, upon receiving a no support message, the software application may terminate the printing function.

FIG. 8 is a flow diagram representative of the branch of the method of the present invention in which a "support" message is received from the device driver at S680 (FIG. 6). At S800, the GDI receives a "support" message from the device driver, which is preferably transmitted via the DrvQueryDeviceSupport return valve (FIG. 11). At S810, the GDI passes the "support" message to the software application via the EXTESCAPE output buffer. Having received the "support" message at S820, the software application calls an image passthrough function having a pointer to the image to be transferred to begin transferring the compressed image.

Figure 12:
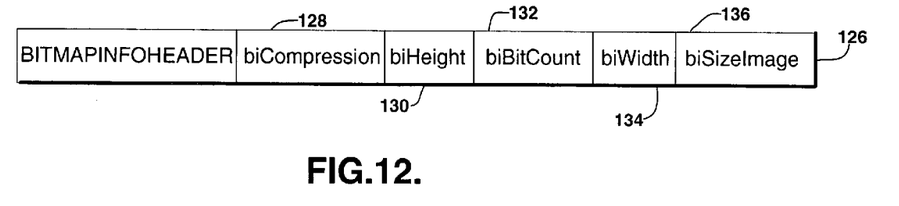
FIG. 12 is a block diagram of a subset of a BITMAPINFOHEADER data structure utilized by the data image transfer method of the present invention.
Figure 13:
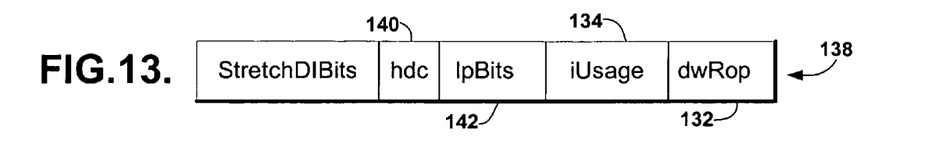
FIG. 13 is a block diagram of a subset of a StretchDIBits application program interface utilized by the data image transfer method of the present invention.
Figure 14:
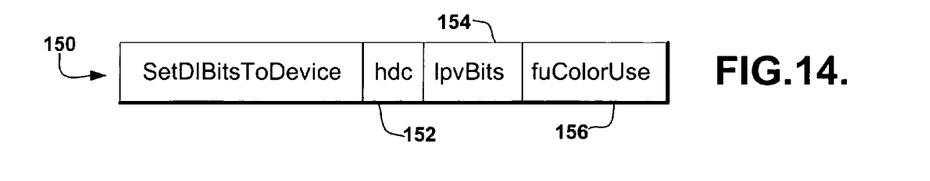
FIG. 14 is a block diagram of a subset of a SetDIBitsToDevice application program interface utilized by the data image transfer method of the present invention.

FIGS. 12, 13 and 14 are illustrative of the data structure and APIs utilized by the present invention to pass the compressed image. FIG. 12 is illustrative of a subset of the BITMAPINFOHEADER data structure 126 which has been extended to allow JPEG or PNG data image files to be passed. A "biCompression" field 128 contains data indicative of the classification of the compressed image file. Preferably, the "biCompression" field 128 is set to BI_JPEG for a JPEG image or BI_PNG for a PNG image. Additionally, a "biHeight" field 130 specifies the pixel height if the "biCompression" field indicates a compressed image file. Similarly, a "biBitCount" field 132, a "BiWidth" field 134 and a "biSizeImage" field 136 are used to set the number of bits per pixel, the pixel width and the size of the buffer containing the image respectively. As would be readily understood, the BITMAPINFOHEADER data structure 126 may contain additional fields (e.g. "biPlanes") which retain their conventional definition and function.

FIGS. 13 and 14 are illustrative of subsets of the SetDIBitsToDevice and StretchDIBits APIs that are utilized in conjunction with the BITMAPINFOHEADER data structure (FIG. 12) to pass the image. With reference to FIG. 13, the StretchDIBits its API 138 copies the color data to a specified destination rectangle. Preferably, the StretchDIBits API 138 includes a "hdc" parameter 140 having a handle to the device context and a "lpBits" parameter 142 containing data indicative of the image, preferably a pointer to the image. Additionally, the API contains an "iUsage" parameter 134 which specifies a bmiColors data related to the BITMAPINFOHEADER data structure (FIG. 12). Preferably, the "iUsage" parameter 134 is set to DIB_RGB_COLORS, indicating the color table contains internal red, green, blue (RGB) values, when passing compressed images. The API also contains a "dwRop" parameter 132 which specifies how the pixels are combined to form a new image. Preferably, the "dwRop" parameter 132 is set to SRCCOPY if the "biCompression" field 128 of the BITMAPINFOHEADER (FIG. 12) is set to indicate a JPEG or PNG image. As would be understood, the StretchDIBits API may contain additional parameters (e.g. "nSrcWidth") which retain their conventional definition and function.

With reference to FIG. 14, the SetDIBitsToDeviceAPI 150 sets the pixels on the target device. Specifically, the SetDIBitsToDevice API 150 includes a "hdc" parameter 152 which contains a handle to the device context. Additionally, SetDIBitsToDevice 150 includes a "lpvBits" parameter 154 which has data indicative of a property of the compressed image, preferably a pointer to the image. SetDiBitsToDevice 148 also includes a "fuColorUse" parameter 156 which specifies whether the BITMAPINFOHEADER data structure (FIG. 12) contains explicit RGB values. Preferably, the "fuColorUse" parameter 156 is set to DIB_RGB_COLORS, indicating the color table contains literal RGB values when passing a compressed image. Again, as would be understood, the SetDiBitsToDevice function 148 may contain additional parameters (e.g. "xDest") which retain their conventional definition and function.

Preferably, the application uses the modified BITMAPINFOHEADER data structure and the SetDIBitsToDevice and StretchDIBits APIs to pass the compressed image. As would be readily understood, different data structures and methods of passing the compressed image file are within the scope of the present invention.

Figure 15:
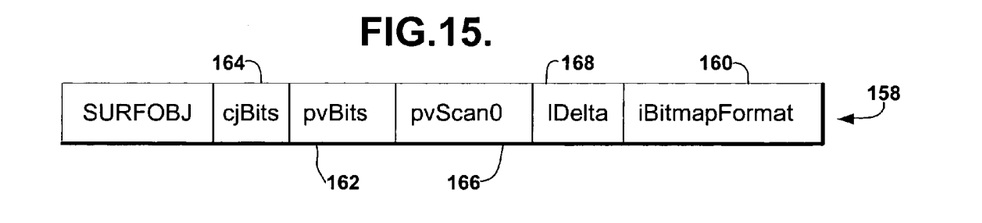
FIG. 15 is a block diagram of a subset of a SURFOBJ data structure utilized by the data image transfer method of the present invention.

With continued reference to FIG. 8, at S830, the GDI receives the passthrough data structure from software application and performs coordinate transformations (such as computing the placement and size of the image on the page using the state associated with the GDI's hdc) without decompressing the image. Additionally, the GDI can also perform image processing of the image without decompressing the image. At S840, the GDI creates a data structure to pass the compressed image. FIG. 15 is illustrative of a subset of the SURFOBJ data structure 158 utilized to pass the compressed image to the device driver. An "iBitmapFormat" field 160 contains data indicative of the classification of the compressed image to be transferred to the device driver. Preferably, the "iBitmapFormat" field 160 is set to BMF_JPEG if the image is a JPEG image or BMF_PNG if the image is a PNG image. A "pvBits" field 162 contains a pointer to a buffer containing the compressed image and a "cjBits" field 164 specifies the size of the image buffer. Additionally, a "pvScan0" field 166 and a "lDelta" field 168 will be ignored if the "iBitmapFormat" field 160 is set to indicate a JPEG or PNG image. Additional fields conventionally defined previously retain their conventional definition and function.

At S850, the GDI calls an applicable device driver interface function to process the SURFOBJ image. Preferably, the device driver interface functions include the DrvBitBlt, DrvCopyBits, DrvPlgBlt, DrvStretchBlt, DrvStretchBltROP, DrvAlphaBlend and DrvTransparentBlt functions. As would be readily understood, additional device driver functions are within the scope of the present invention.

At S860, the device driver parses the image and performs inspection functions. At S870, if the device driver cannot accept the image, it returns a no accept message at S880. Unlike the previous parsing and inspection functions at S650-660 (FIG. 6), if the device driver cannot process the image, a "no accept" message is returned. In the event the print job is not spooled, the "no accept" message is sent back to the application, and the application can conventionally process the image as a DIB, as illustrated on steps S720-S760 (FIG. 7). In the event the print job is spooled, the particular API (SetDIBitsToDevice or StretchDIBits (FIGS. 13 & 14)) will fail, and the compressed image will not be outputted to the device. However, any remaining portions of the print job will be processed and outputted to the device. Alternatively, in the event a "no accept" message is received, the entire print job may be terminated by either the application or the GDI.

If at S870, however, the device driver returns an "accept" message, the device driver packages the image for processing by the hardware device at S890. For example, for a PostScript printer, a JPEG image is packaged into a decoding header including instructions from the device driver and the raw image for printing. The resulting data is then ready for printing. As would be readily understood, application of the present invention to device format packaging other than for a PostScript printer is considered within the scope of the present invention.

Preferably, the image passthrough extensions structure and method of the present invention is implemented in Microsoft Corporation's "WINDOWS 98™" or "WINDOWS 2000™" operating system. By utilizing new or expanded data structures, the present invention allows compressed data image files to be transferred directly from a software application to a printer configured to decompress these images without placing additional strain on the communication resources of the computer system and the storage resources of a printer spooler. Additionally, although many program languages could be used to create the objects and functions of the present invention, the present invention may preferably be coded by an object oriented language such as Microsoft Corporation's "VISUAL C++®" or "VISUAL BASIC®" programming languages.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. A method in a computer system for transferring a compressed data file from a software application running within the computer system to a printer in communication with the computer system, said method comprising:
    receiving at a device driver on the computer system a request sent from an application inquiring about whether a type of compression is supported;
    determining at the device driver both whether the printer is configured to decompress the type of compression and determining whether the device driver is capable of decompressing the type of compression;
    if it is determined that either the printer or the device driver is configured to decompress the type of compression inquired about by the application, then returning a response to the application that the type of compression is supported; and
    if it is determined that neither the printer nor the device driver is configured to decompress the type of compression inquired about by the application, then returning a response to the application that the type of compression is not supported.

2. The method as recited in claim 1, wherein said receiving a request to transfer a compressed data file includes receiving a data structure from the software application, the data structure containing an indication of a classification of the compressed data file format and a pointer to the compressed data file.

3. The method as recited in claim 1, wherein said determining whether the printer is configured to decompress the compressed data file further comprises:
    obtaining a device file decompression configuration data structure, the data structure containing data indicative of compressed data file formats supported by the printer; and
    determining whether the file decompression configuration data structure indicates whether the printer is configured to decompress the compressed data file.

4. The method as recited in claim 1, wherein said determining whether the printer is configured to decompress the compressed data file includes:
    passing a compressed data file pointer to the printer; and
    receiving an indication whether the printer is configured to decompress the compressed data file.

5. The method as recited in claim 1, wherein the compressed data file is a compressed data image file.

6. The method as recited in claim 5, wherein the compressed data image file is a JPEG image.

7. The method as recited in claim 5, wherein the compressed data image file is a PNG image.

8. The method as recited in claim 1 further comprising receiving an uncompressed data file from the software application if the printer is not configured to receive the compressed data file.

9. One or more tangible computer-readable media having computer-executable components comprising:
    (a) a device support query component that, when executed, determines whether a printer is configured to perform a type of decompression corresponding to a type of compression of a compressed data file associated with an application and also determines whether a device driver for the printer is configured to perform the type of decompression and in accordance with both determinations returns a response to the query indicating whether or not the type of compression is supported;

(b) an application interface component that, when executed, receives the compressed data file from the application, the compressed data file having been sent by the application in accordance with the response from the device support query component indicating whether or not the type of compression is supported; and (c) a device interface component that transfers the compressed data file to the printer via the device driver.

10. The one or more tangible computer-readable media of claim 9, wherein said application interface component further comprises a compressed data file information transformation component that, when executed, manipulates data within the compressed data file.

11. A method in a computer system for transferring a compressed data file from a software application running within the computer system to a printer in communication with the computer system, said method comprising:
requesting a determination whether the device is configured to decompress the compressed data file;
receiving a response whether the printer is so configured, the response having been made based both on whether the printer supports a type of compression by which the data file was compressed and based on whether a device driver for the printer supports the type of compression; and
if the response indicates that the type of compression needed to decompress the compressed data file is supported, then transferring the compressed data file to the device driver, and if not, then transferring the data file in uncompressed form.

12. The method as recited in claim 11, wherein said requesting includes passing a pointer a pointer to the compressed data file and a indication of a type of compressed data file to the computer system.

13. The method as recited in claim 11, wherein said transferring includes passing the compressed data file to the printer via a data structure.

14. The method as recited in claim 11 further comprising decompressing the compressed data file and transferring the uncompressed data file to the printer if the printer is not configured to decompress the compressed data file.

15. The method as recited in claim 11, wherein the compressed data file is a compressed data image file.

16. The method as recited in claim 15, wherein the compressed data image file is a JPEG compressed data image file.

17. The method as recited in claim 15, wherein the compressed data image file is a PNG compressed data image file.

18. A method in a computer system for rendering a compressed data file on a printer in communication with a computer system said method comprising:

receiving a request from an application, the request including a pointer to a compressed data file to be printed by the printer, the compressed data file having been compressed by a type of compression algorithm, the request being received by a device driver for the printer;

responsive to the request, determining by the device driver a type of compression algorithm by which the compressed data file was compressed, where the device driver determines the type of the compression algorithm by using the received pointer to access the compressed data file and then attempting to decompress all or a portion of the compressed data file;

determining whether the printer implements a type of decompression algorithm for decompressing data files compressed with a compression algorithm of the type determined by the device driver, thereby determining whether the printer is capable of decompressing the compressed data file, and determining whether the device driver for the printer implements the type of decompression algorithm for decompressing data files compressed with a compression algorithm of the type indicated by the request, thereby determining whether the device driver is capable of decompressing the compressed data file;

if the determining indicates that either the printer or the device driver are capable of decompressing the compressed data file, sending the compressed data file from the application to the printer via the device driver; and if the determining indicates that neither the printer nor the device driver is capable of decompressing the compressed the compressed data file, sending a message from the device driver to the application indicating that the data file cannot be decompressed, and in response the application uncompressing the compressed data file and sending the uncompressed data file to the printer via the device driver.

19. The method as recited in claim 18, wherein receiving said request includes receiving a data structure from the software application, the data structure containing an indication of the type of the compression algorithm and the pointer to the compressed data file.

20. The method as recited in claim 18, wherein said determining whether the printer is capable of decompressing the compressed data file further comprises;
obtaining a decompressing-configuration data structure, the data structure containing data indicative of compressed-data-file formats supported by the printer; and
determining whether the file decompressing-configuration data structure indicates whether the printer is configured to decompress the compressed data file.

* * * * *